US010712746B2

(12) United States Patent
Li et al.

(10) Patent No.: US 10,712,746 B2
(45) Date of Patent: Jul. 14, 2020

(54) METHOD AND SYSTEM TO CONSTRUCT SURROUNDING ENVIRONMENT FOR AUTONOMOUS VEHICLES TO MAKE DRIVING DECISIONS

(71) Applicant: Baidu USA LLC, Sunnyvale, CA (US)

(72) Inventors: Liyun Li, Sunnyvale, CA (US); Dong Li, Sunnyvale, CA (US); Jiangtao Hu, Sunnyvale, CA (US); Yifei Jiang, Sunnyvale, CA (US); Jiaming Tao, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 260 days.

(21) Appl. No.: 15/250,815

(22) Filed: Aug. 29, 2016

(65) Prior Publication Data
US 2018/0059672 A1 Mar. 1, 2018

(51) Int. Cl.
*G05D 1/02* (2020.01)
*G05D 1/00* (2006.01)
*B60W 30/00* (2006.01)

(52) U.S. Cl.
CPC ........... *G05D 1/0221* (2013.01); *B60W 30/00* (2013.01); *G05D 1/0088* (2013.01); *G05D 1/0276* (2013.01); *G05D 2201/0213* (2013.01)

(58) Field of Classification Search
CPC .. G05D 1/0221; G05D 1/0088; G05D 1/0276; G05D 2201/0213; G06N 5/00

USPC .................................................. 703/300–302
See application file for complete search history.

(56) References Cited

U.S. PATENT DOCUMENTS

| 6,151,539 | A | 11/2000 | Bergholz et al. |
| 9,050,977 | B1 | 6/2015 | Dolgov et al. |
| 2011/0054793 | A1* | 3/2011 | Harada ............ G08G 1/096725 701/301 |
| 2012/0310466 | A1* | 12/2012 | Fairfield ................ G05D 1/024 701/28 |
| 2015/0316387 | A1 | 11/2015 | Ichikawa et al. |
| 2018/0005407 | A1* | 1/2018 | Browning .............. G01C 21/32 |

* cited by examiner

*Primary Examiner* — Nga X Nguyen
(74) *Attorney, Agent, or Firm* — Womble Bond Dickinson (US) LLP

(57) ABSTRACT

In response to sensor data received from sensors mounted on an autonomous vehicle, a surrounding environment is perceived based on the sensor data. The surrounding environment includes multiple sub-environments. For each of the sub-environments, one of a plurality of driving scenario handlers associated with the sub-environment is identified, each driving scenario handler corresponding to one of a plurality of driving scenarios. The identified driving scenario handler is invoked to determine an individual driving condition within the corresponding sub-environment. An overall driving condition for the surrounding environment is determined based on the individual driving conditions provided by the identified driving scenario handlers. A route segment is planned based on the overall driving condition of the surrounding environment, the route segment being one of a plurality of route segments associated with a route. The autonomous vehicle is controlled and driven based on the planned route segment.

12 Claims, 10 Drawing Sheets

METHOD AND SYSTEM TO CONSTRUCT SURROUNDING ENVIRONMENT FOR AUTONOMOUS VEHICLES TO MAKE DRIVING DECISIONS

TECHNICAL FIELD

Embodiments of the present invention relate generally to operating autonomous vehicles. More particularly, embodiments of the invention relate to constructing a surrounding environment for autonomous vehicles to make driving decisions.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Similar to human beings making various decisions while driving, an autonomous vehicle always has to make instant driving decisions according to the actual surrounding environment, which includes, but is not limited to, signal lights, traffic conditions, safety regulations, nearby pedestrians and vehicles, etc. When a human being drives a vehicle, he/she implicitly acknowledges the existence of each perceived object and associates a decision with each object. Thus, the actual decision outcome of human drivers is from a complicated and synthesized procedure, where individual decisions towards each object are consolidated and synthesized into a final decision which transforms into the anticipated trajectory of the vehicle and hence the actual handing of a steering-wheel, brake, and/or throttle. It is challenging to emulate such a thinking process in an autonomous vehicle.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
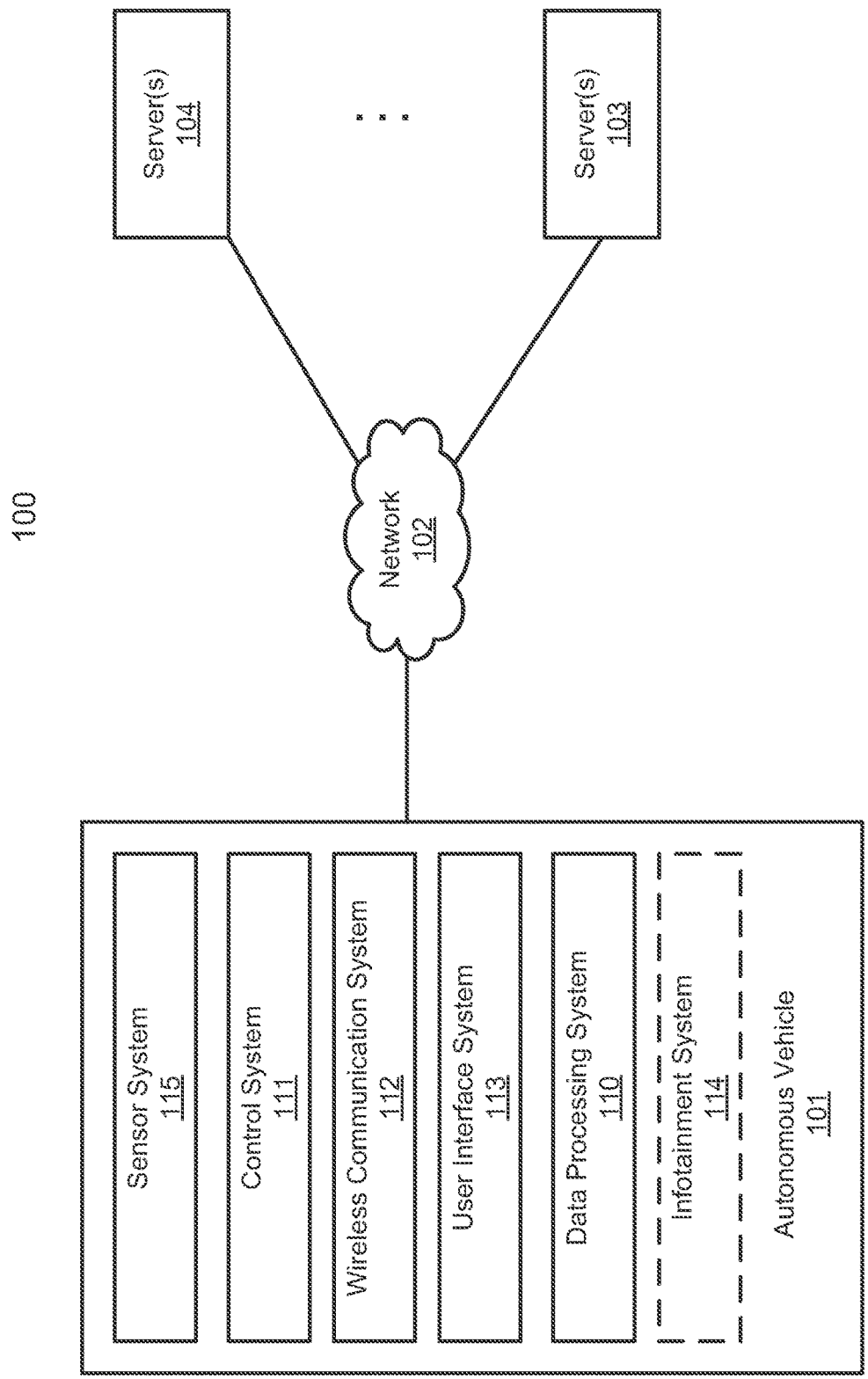
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when building an autonomous vehicle, the system emulates the human thought process by constructing a driving environment specifically designed for the autonomous vehicle to understand the driving environment and make safe and appropriate decisions. The driving environment (also referred to as a driving world) consists of several sub-environments (also referred to as sub-worlds). Each sub-environment covers a specific spatiotemporal area or a driving scenario for a designated purpose. In one embodiment, an environment to be constructed captures all the objects human beings can perceive under all necessary contexts. Under different scenarios, an object could have different meanings and hence different decisions are made towards the object since it may appear in different sub-environments. The decisions of an object from each sub-environment is consolidated in a coherent way for the actual final decision and handling. A final decision, which indicates the actual handling of the vehicle, is inferred from the final decisions of each individual object. The sub-environments cover all the necessary scenarios similar to human driving experience while each sub-environment is preferred to be designated for a specific purpose or a driving scenario such that these sub-environments could be somewhat independent thus making it easy to develop, maintain, and construct in parallel rapidly.

In one embodiment, in response to sensor data received from various sensors mounted on an autonomous vehicle, a surrounding environment of the autonomous vehicle is perceived based of the sensor data. The surrounding environment includes multiple sub-environments surrounding the autonomous vehicle. For each of the sub-environments, one of driving scenario handlers associated with a driving scenario corresponding to the sub-environment is identified. Each of the driving scenario handlers handles a specific driving scenario within a driving sub-environment. The identified driving scenario handler is invoked to determine a driving condition or driving atmosphere within the corresponding sub-environment. An overall driving condition for the surrounding environment is determined based on the driving conditions of the sub-environments provided by the driving scenario handlers. A route segment is planned based on the understanding of the overall driving condition of the surrounding environment. The autonomous vehicle is controlled and driven according to the route segment. The route segment is one of many route segment of a route from a starting location to a destination location. The above process may be iteratively performed for each route segment along the route.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (POI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, data processing system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or data processing system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
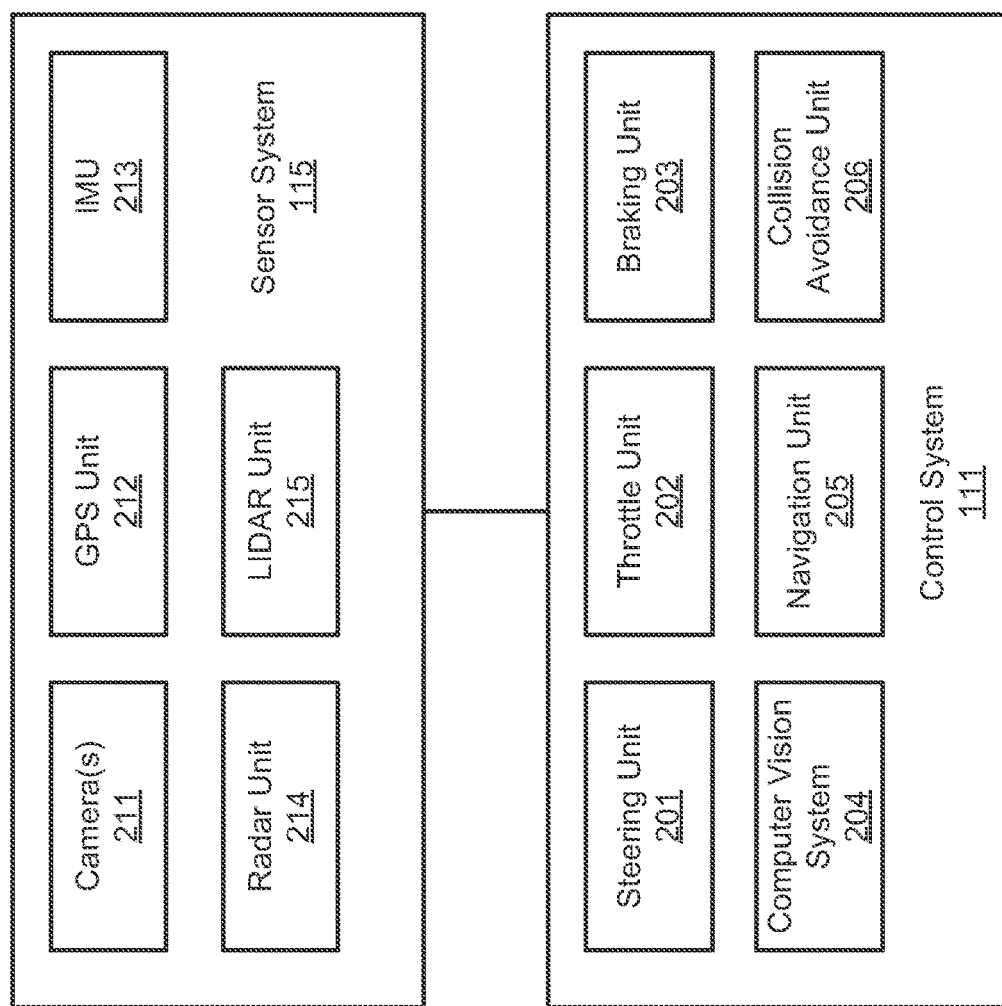
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, computer vision system 204, navigation unit 205 (also referred to as a navigation and pathing or navigation/pathing system), and collision avoidance unit 206 (also referred to as an obstacle avoidance system). Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Computer vision unit or system 204 is to process and analyze images captured by one or more cameras 211 in order to identify objects and/or features in the environment of autonomous vehicle. The objects can include traffic signals, road way boundaries, other vehicles, pedestrians, and/or obstacles, etc. Computer vision system 204 may use an object recognition algorithm, video tracking, and other computer vision techniques. In some embodiments, computer vision system 204 can map an environment, track objects, and estimate the speed of objects, etc.

Navigation unit or system 205 is to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. Navigation system 205 may update the driving path dynamically while the autonomous vehicle is in operation. Navigation system 205 can incorporate data from a GPS system and one or more maps so as to determine the driving path for the autonomous vehicle.

Collision avoidance unit or system 206 is to identify, evaluate, and avoid or otherwise negotiate potential obstacles in the environment of the autonomous vehicle. For example, collision avoidance system 206 may effect changes in the navigation of the autonomous vehicle by operating one or more subsystems in the control system to undertake swerving maneuvers, turning maneuvers, braking maneuvers, etc. Collision avoidance system 206 may automatically determine feasible obstacle avoidance maneuvers on the basis of surrounding traffic patterns, road conditions, etc. Collision avoidance system 206 may be configured such that a swerving maneuver is not undertaken when other sensor systems detect vehicles, construction barriers, etc. in the region adjacent the autonomous vehicle that would be swerved into. Collision avoidance system 206 may automatically select the maneuver that is both available and maximizes safety of occupants of the autonomous vehicle. Collision avoidance system 206 may select an avoidance maneuver predicted to cause the least amount of acceleration in a passenger cabin of the autonomous vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some of all of the functions of autonomous vehicle 101 may be controlled or managed by data processing system 110, especially when operating in an autonomous driving mode. Data processing system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, data processing system 110 may be integrated with vehicle control system 111.

For example, a user as a passenger may specify a starting location and a destination of a trip, for example, via a user interface. Data processing system 110 communicates with other components of autonomous vehicle 101 to obtain the trip related data. For example, data processing system 110 may obtain location and route information from a location server and a map and POI (MPOI) server, which may be a part of servers 103-104. The location server provides location services and MPOI server 105 provides map services and the POIs of certain locations. Alternatively, such location and MPOI information may be cached locally in a persistent storage device of data processing system 110.

During traveling of autonomous vehicle 101 along the route, data processing system 110 may also obtain real-time traffic information from a traffic information system or server (TIS). Note that servers 103-104 may be operated by a third party entity. Alternatively, the functionalities of servers 103-104 may be integrated with data processing system 110. Based on the real-time traffic information, MPOI information, and location information, as well as real-time local environment data detected or sensed by sensor system 115 (e.g., obstacles, objects, nearby vehicles), data processing system 110 can plan an optimal route and drive vehicle 101, for example, via control system 111, according to the planned route to reach the specified destination safely and efficiently.

According to one embodiment, autonomous vehicle 101 may further include infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

In an autonomous vehicle, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there is a corresponding display channel to stream the corresponding content to be displayed at real-time, which may be centrally processed by an augmenting reality system, e.g., infotainment system 114 and/or data processing system 110. In such situation, an augmented image is displayed in a virtual reality manner via infotainment system 114, also referred to as an augmented reality manner.

In one embodiment, based on location and route information, MPOI information, and/or real-time traffic information, infotainment system 114 and/or data processing system 110 determines certain types of content that are suitable for the current traffic environment (e.g., MPOIs). The system performs a lookup operation in a content index (not shown) to identify a list content items (e.g., sponsored content or Ads) as content item candidates, for example, based on the real-time traveling information.

According to one embodiment, data processing system 110 includes a planning module and a control module (not shown). The planning module is to plan a route or route segments of a route to allow the control module to control and drive autonomous vehicle 101 to move along the planned route. The route may be generated based on the understanding or perception of an overall driving environment surrounding autonomous vehicle 101 based on sensor data received from a variety of sensors mounted on autonomous vehicle.

In one embodiment, in constructing or understanding an overall driving environment, the driving environment is divided or perceived into one or more sub-environments, each representing a segment of the environment. Each sub-environment is handled by a respective driving scenario handler to determine a set of driving parameters or metadata representing a driving condition within the sub-environment. When moving along a route, periodically (e.g., every 0.1 second), autonomous vehicle 101 receives sensor data from sensor system 115 and perceives the surrounding environment of the autonomous vehicle 101. Autonomous vehicle 101 recognizes and divides the surrounding environment into one or more sub-environments.

For each of the sub-environments, a corresponding driving scenario handler is identified and invoked to determine a driving condition or settings of the sub-environment. Autonomous vehicle 101 then understands and determines the overall driving condition of the entire driving environment based on the individual driving conditions of the sub-environment. A next route segment is planned based on the understanding of the driving condition of overall surrounding environment. Autonomous vehicle 101 then moves according to the route segment. The above process is iteratively performed for each of the route segments at different points in time along the route. Similar to video frames of a video stream, for each frame representing the surrounding environment at a particular point in time, the above process is performed to determine driving condition or driving parameters for driving autonomous vehicle 101 over a next route segment.

Figure 3A:
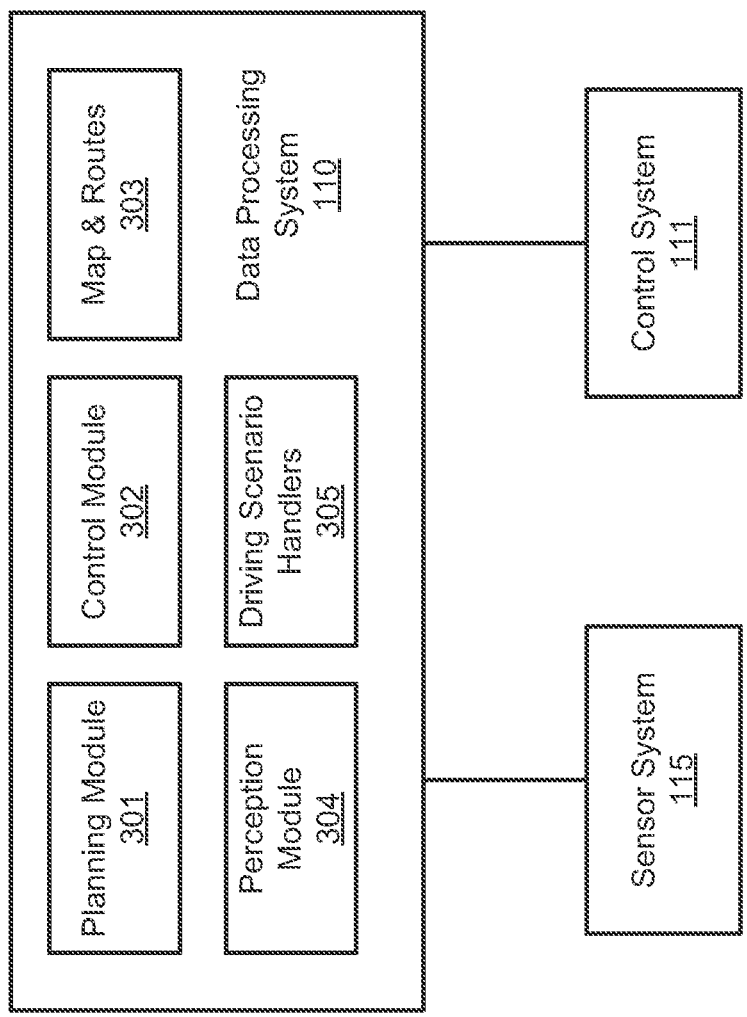
FIGS. 3A and 3B are block diagrams illustrating an example of a data processing system used with an autonomous vehicle according to certain embodiments of the invention.

FIG. 3A is a block diagram illustrating an example of a data processing system used with an autonomous vehicle according to one embodiment of the invention. System 300 may be implemented as autonomous vehicle 101 of FIG. 1. Referring to FIG. 3A, data processing system 110 includes, but is not limited to, planning module 301, control module 302, map and route module 303, and perception module 304. In addition, data processing system 110 further includes a list of driving scenario handlers 310, each driving scenario handler handling a specific driving scenario within a corresponding sub-environment of an overall driving environment.

Perception module 304 processes sensor data received from sensor system 115 to perceive the driving environment, such as the perceived pedestrians, vehicles, and obstacles, along with master vehicle status information (localization, GPS information and chassis status) are gathered and converted to feed into planning module 301 for processing and decision making. Perception module 304 is the module processing "what do I see and where I am." Map and route module 303 is the module where map and routing information are stored. Map and route module 305 stores information of "where should I go, what are the roads around me."

Planning module 301 is to plan a path or route for the autonomous vehicle based on a variety of information, such as, sensor data received from sensor system 115 and/or real-time information received from a variety of sources (e.g., location, map, POI as part of map and point of interest or MPOI database 303). The planning and control data is generated by planning module 301. Based on the planning and control data control module 302 is to control the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Planning module 301 is the core logic module for the autonomous vehicle to make driving decision and planning. It considers the map, the route and the perceived objects, and based on traffic rules and/or previous experiences, decides and plans how the vehicle should be maneuvered. Information regarding the desired maneuvered status, such as trajectories and speed/acceleration are passed to control module 302 for further processing. Note that planning module 301 and control module 302 may be communicatively coupled to or integrated with navigation unit 205 of vehicle control system 111 of FIG. 2.

In planning a route or a route segment, planning module 301 invokes one or more of driving scenario handlers corresponding to the perceived sub-environments of a surrounding environment determined by perception module 304. Each driving scenario handler processes the perceived sub-environment to determine a driving condition of the sub-environment, including determining what objects are located within the sub-environment and what the vehicle should move if the vehicle decides to enter that sub-environment. Based on the individual driving conditions obtained from the driving scenario handlers, planning module 301 performs the decision making. Specifically, planning module 301 constructs an overall surrounding environment based on the sub-environments perceived and processed by the individual driving scenario handlers. Planning module 301 makes the final route decision based on the individual decisions or recommendations from the individual driving scenario handlers. Planning module 301 then generates planning and control data representing a next route segment and transmits the planning and control data to control module 302. Based on the planning and control data, control module 302 issues proper control commands or instructions to control system 111 to drive the vehicle to move within the next route segment.

Figure 3B:
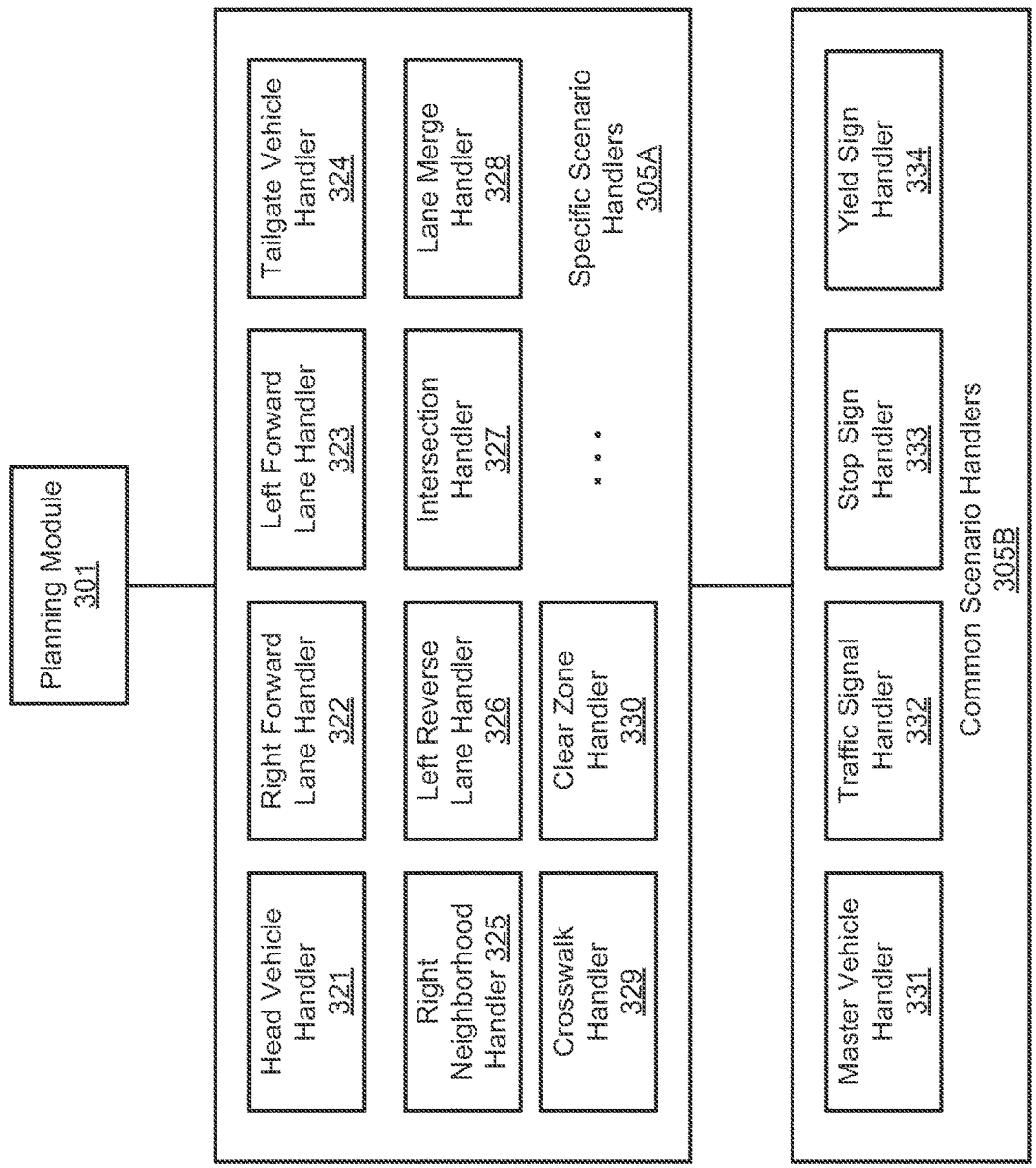

FIG. 3B is a block diagram illustrating examples of driving scenario handlers according to one embodiment of the invention. Referring to FIG. 3B, in one embodiment, driving scenario handlers include two layers: 1) specific scenario handlers 305A, and 2) common scenario handlers 305B. Each of the specific scenario handlers 305A handles driving of a specific sub-environment, including identifying an object in the sub-environment, a distance between the object and the vehicle, and a decision of what the vehicle should move in the event that the vehicle enters that particular sub-environment, etc. Each of the common scenario handlers 305B handles certain common scenarios that are shared by the specific scenarios. Each of the common scenario handlers 305B may be invoked by any one of the specific scenario handlers 305A. Each scenario handler provides a series of APIs, which essentially extracts attributes or objects associated with certain attributes. These APIs are leveraged by planning module 301 to better understand the surrounding environment and make appropriate decisions based on them.

In one embodiment, specific scenario handlers 305A include, but are not limited to, head vehicle handler 321, right forward lane handler 322, left forward lane handler 323, tailgate vehicle handler 324, right neighborhood handler 325, left reverse lane handler 326, intersection handler 327, lane merge handler 328, crosswalk handler 329, and clear zone handler 330. Common scenario handlers 305B include, but are not limited to, master vehicle handler 331, traffic signal handler 332, stop sign handler 333, and yield sign handler 334.

Master vehicle handler 331 provides information about the vehicle itself, including, but is not limited to, which lane the vehicle is currently in, which direction the vehicle is moving, and location, map, and route information of the vehicle. Head vehicle handler 321 provides information concerning a head vehicle currently moving in front of the autonomous vehicle, including the speed the head vehicle and distance between the head vehicle and the autonomous vehicle. Head vehicle handler 321 may further provide a recommendation whether the autonomous vehicle should follow the head vehicle or pass the head vehicle.

Right forward lane handler 322 and left forward lane handler 323 provide information concerning a right forward lane and a left forward lane with respect to the autonomous vehicle respectively. The provided information may include all the objects or vehicles located in the spatial area of the right and/or left forward lanes. For example, the forward lane handler may indicate an object to nudge if the autonomous vehicle does not want to change lane or an object to yield or overtake if the autonomous vehicle wants to change lane. Left reverse lane handler 326 may indicate an object is approaching the autonomous vehicle in an opposite direction and a suggestion whether to nudge. Lane merge handler 328 may provide information indicating whether the autonomous vehicle should yield or overtake. Lane merge handler 328 may coordinate with traffic signal handler 332 and yield sign handler 334.

Tailgate vehicle handler 324 may identify any tailgate vehicle that is following the autonomous vehicle including its speed and distance between the tailgate vehicle and the autonomous vehicle. Right neighborhood object handler 325 models the environment of any objects which are not on any actual lanes, but to the right neighborhood region of the current right lane. Examples include a bike on the right side of a bike lane, pedestrians on the right side curbs, or parked vehicles or static objects on the right.

Intersection handler 327 models the entire traffic junction, including the areas where vehicles are traveling from one area to another designated intersection area. For example, when making a right turn, the planning module 301 would utilize intersection handler 327 to provide possible conflicting traffic, which may need to be overtaken or yielded, given traffic rules and conditions. Intersection handler 327 may indicate which object or objects to overtake, yield, or stop given a specific route to be performed.

Crosswalk handler 329 models an area where a potential pedestrian might walk across through. Crosswalk handler 329 may identify if there is any pedestrian in the crosswalk. Clear zone handler 330 models an area in which the autonomous vehicle can go through, but cannot stop. Clear zone handler 330 may coordinate with traffic signal handler 332 to determine whether the autonomous vehicle should go through or stop before entering the clear zone.

Traffic signal handler 332 provides signal information that governs the current route of the autonomous vehicle to the destination. Traffic signal handler 332 may further indicate how long a particular traffic signal has remained since the last change of signals. Stop sign handler 333 provides information indicating whether there is a stop sign in the current lane or other lanes. Stop sign handler 333 may further indicate whether the autonomous vehicle has the right of way. Stop sign handler 333 may further identify an object of which the autonomous vehicle has or do not have the right of way. Stop sign handler 333 may further indicate whether the autonomous vehicle has stopped for a sufficient period of time (e.g., 3 seconds) before it starts moving again. Similarly, yield sign handler 334 indicates whether there is a yield sign in the current lane and other lanes. Handlers 332-334 may be invoked by any of the specific handlers 321-330.

Figure 4A:
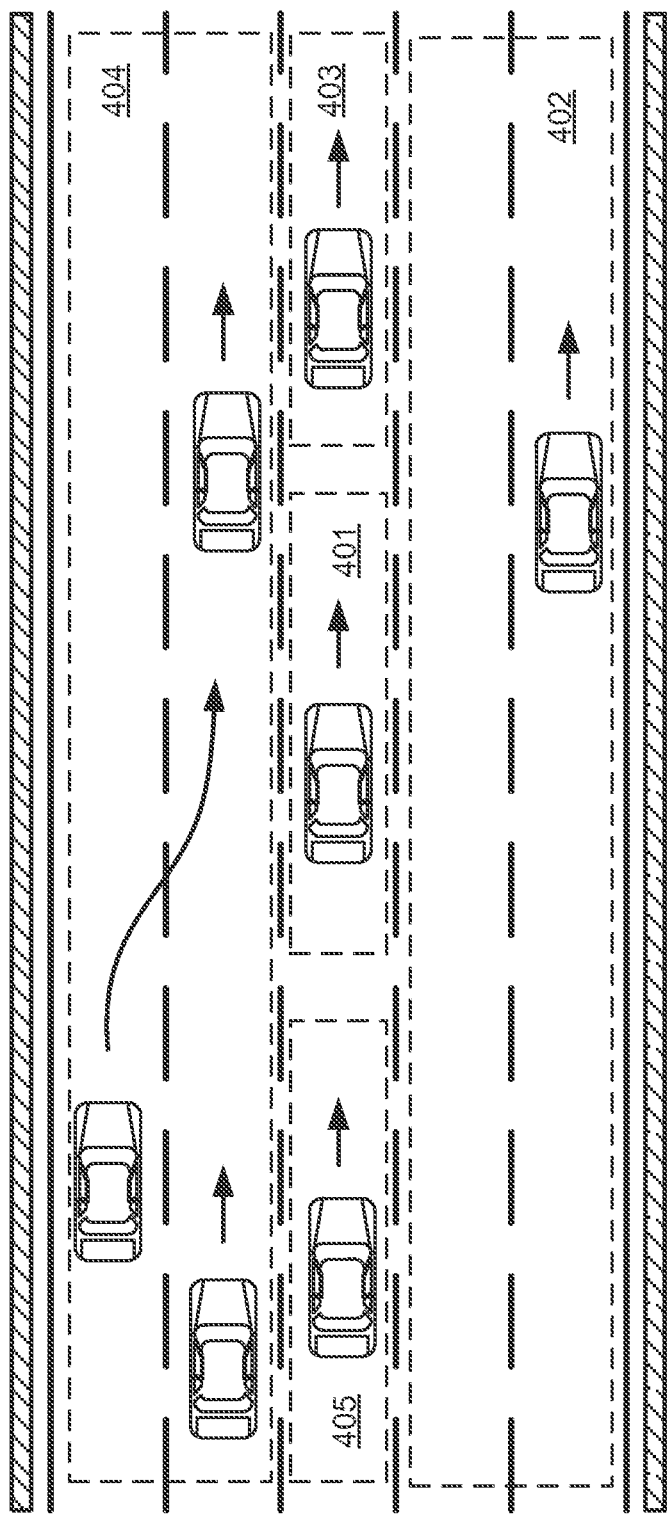
FIGS. 4A and 4B are block diagrams illustrating an example of driving scenarios according to one embodiment of the invention.
Figure 4B:
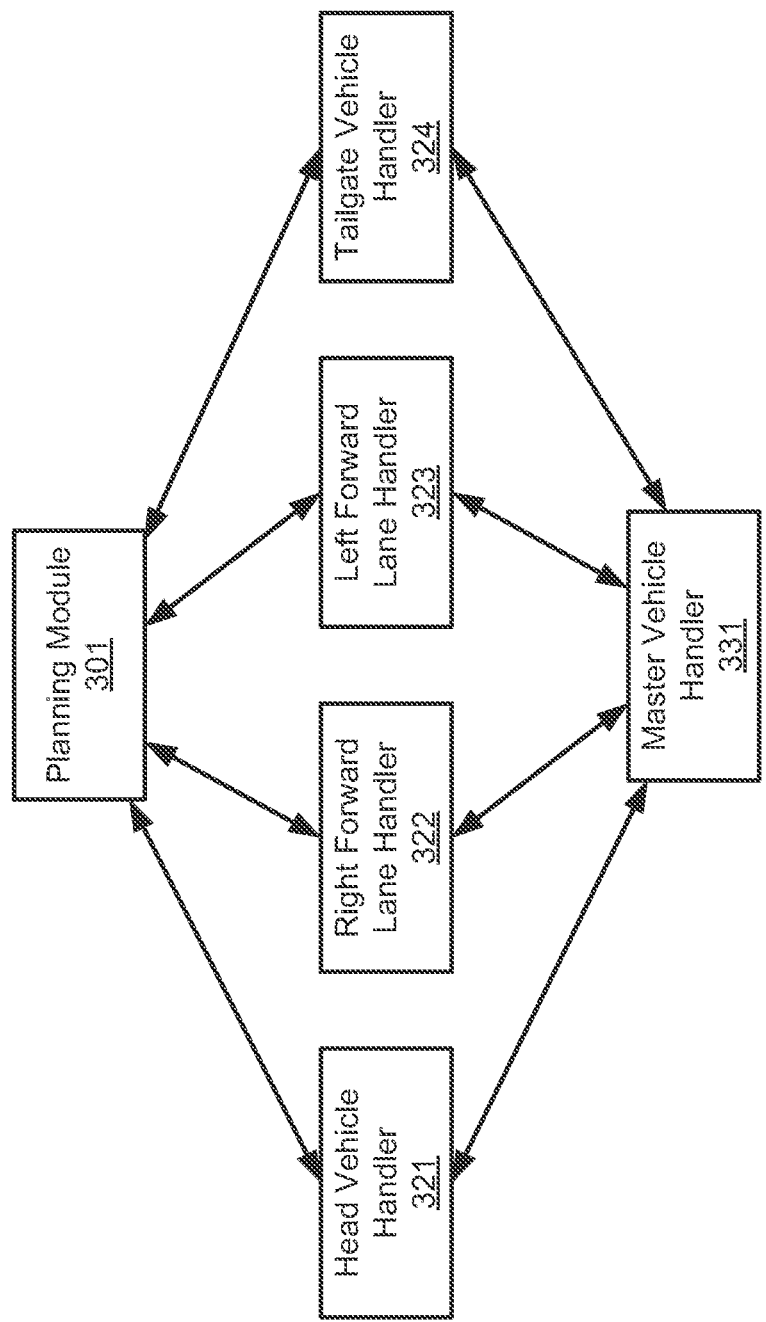

FIG. 4A is a diagram illustrating an example of driving scenarios according to one embodiment of the invention. Referring to FIG. 4A, in this example, autonomous vehicle 401 (represented by master vehicle handler 331) is driving in a middle lane. Based on the sensor data received sensor system 115, there have been perceived sub-environments 402-405, each of which is indicated in a dash box. Sub-environment 402 represents a right forward lane scenario. Sub-environment 403 represents a head vehicle scenario in front of master vehicle 401. Sub-environment 404 represents a left forward lane scenario. Sub-environment 405 represents a tailgate vehicle scenario. Once these sub-environments 402-405 have been perceived and identified, corresponding driving scenario handlers, such as head vehicle handler 321, right forward lane handler 322, left forward lane handler 323, and tailgate vehicle handler 324, can be identified and invoked by planning module 301 as shown in FIG. 4B.

Based on the information representing the driving conditions of the sub-environments provided by the associated scenario handlers, planning module 301 plans a route or route segment to generate planning and control data for controlling the autonomous vehicle. In this example, head vehicle handler 321 may provide information concerning the head vehicle in sub-environment 403, such as the speed and distance from the autonomous vehicle. It may provide a recommendation whether the autonomous vehicle should follow the head vehicle or change lane. Similarly, tailgate vehicle handler 324 provides information concerning a vehicle traveling behind the autonomous vehicle within sub-environment 405, including its speed and the distance between the tailgating vehicle and the autonomous vehicle.

Right forward lane handler 322 and left forward lane handler 323 provides driving conditions within their respective sub-environments 404 and 402. In this example, left forward lane handler 323 may indicate there are two vehicles travelling at a near left lane and there is another vehicle merging from a far left lane to the near left lane. Right forward lane handler 322 may indicate there is a vehicle on the far right lane but there is no vehicle in the near right lane. Based on all of the information concerning sub-environments 402-405, planning module 301 may decide to change lane to the near right lane. By segmenting the overall environment into multiple sub-environments, each being handled by a specific driving scenario handler, the decision making of planning module 301 can be more efficient.

Figure 5A:
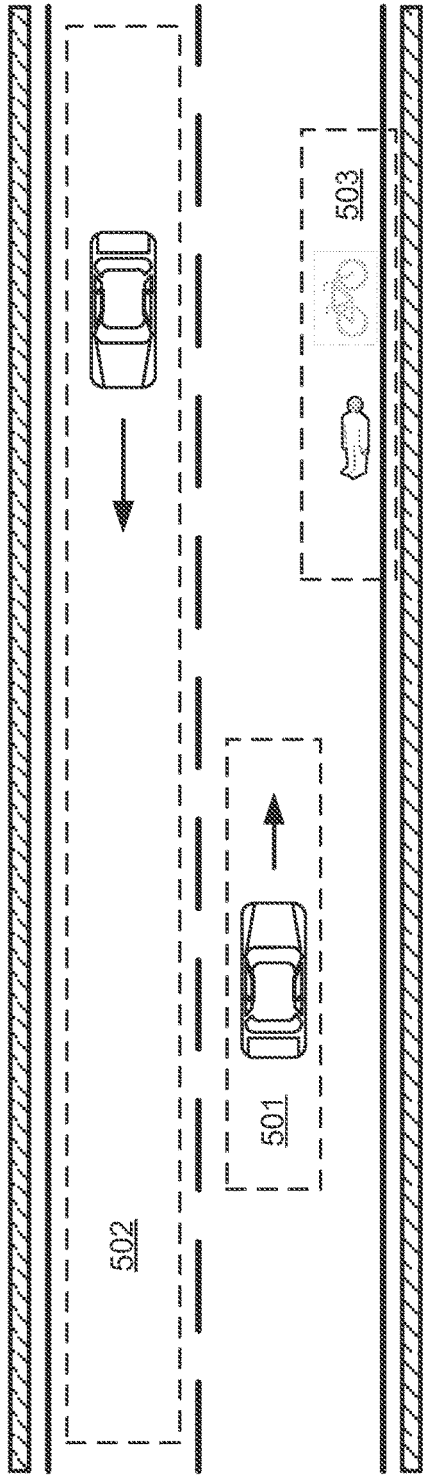
FIGS. 5A and 5B are block diagrams illustrating an example of driving scenarios according to another embodiment of the invention.
Figure 5B:
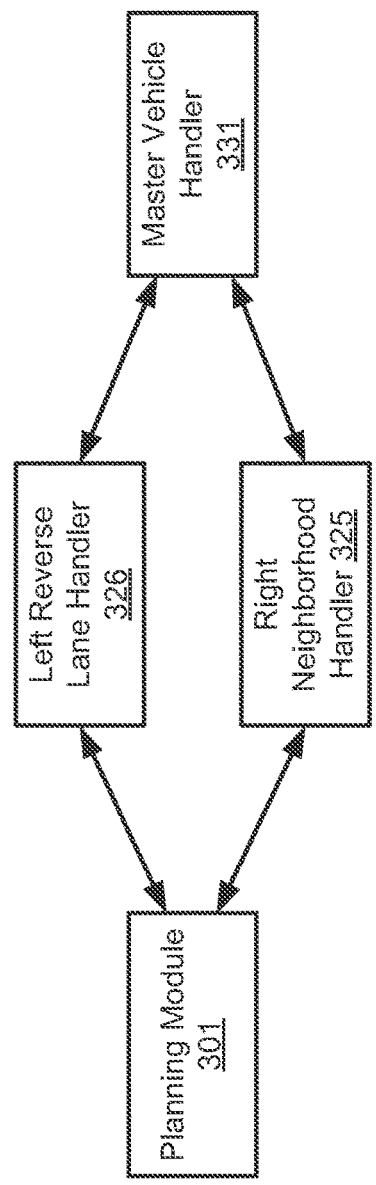

FIG. 5A is a diagram illustrating an example of driving scenarios according to another embodiment of the invention. Referring to FIG. 5A, in this example, the environment has been perceived to have left reverse lane sub-environment 502 and right neighborhood sub-environment 503 based on the sensor data provided by sensor system 115. Accordingly, left reverse lane handler 326 and right neighborhood handler 325 are invoked to determine the driving conditions within sub-environments 502-503 as indicated in FIG. 5B. In this example, left reverse handler 326 may indicate that there is upcoming traffic on the left lane in an opposite direction, including its speed and distance. Right neighborhood handler 325 may indicate that there is a pedestrian and a bicycle on the curve of the lane in which the autonomous vehicle represented by master vehicle sub-environment 501 is travelling. Planning module 301 may plan a route accordingly, such as, for example, reducing the speed of the autonomous vehicle, let the opposing vehicle pass before passing the pedestrian and the bicycle, etc.

Figure 6:
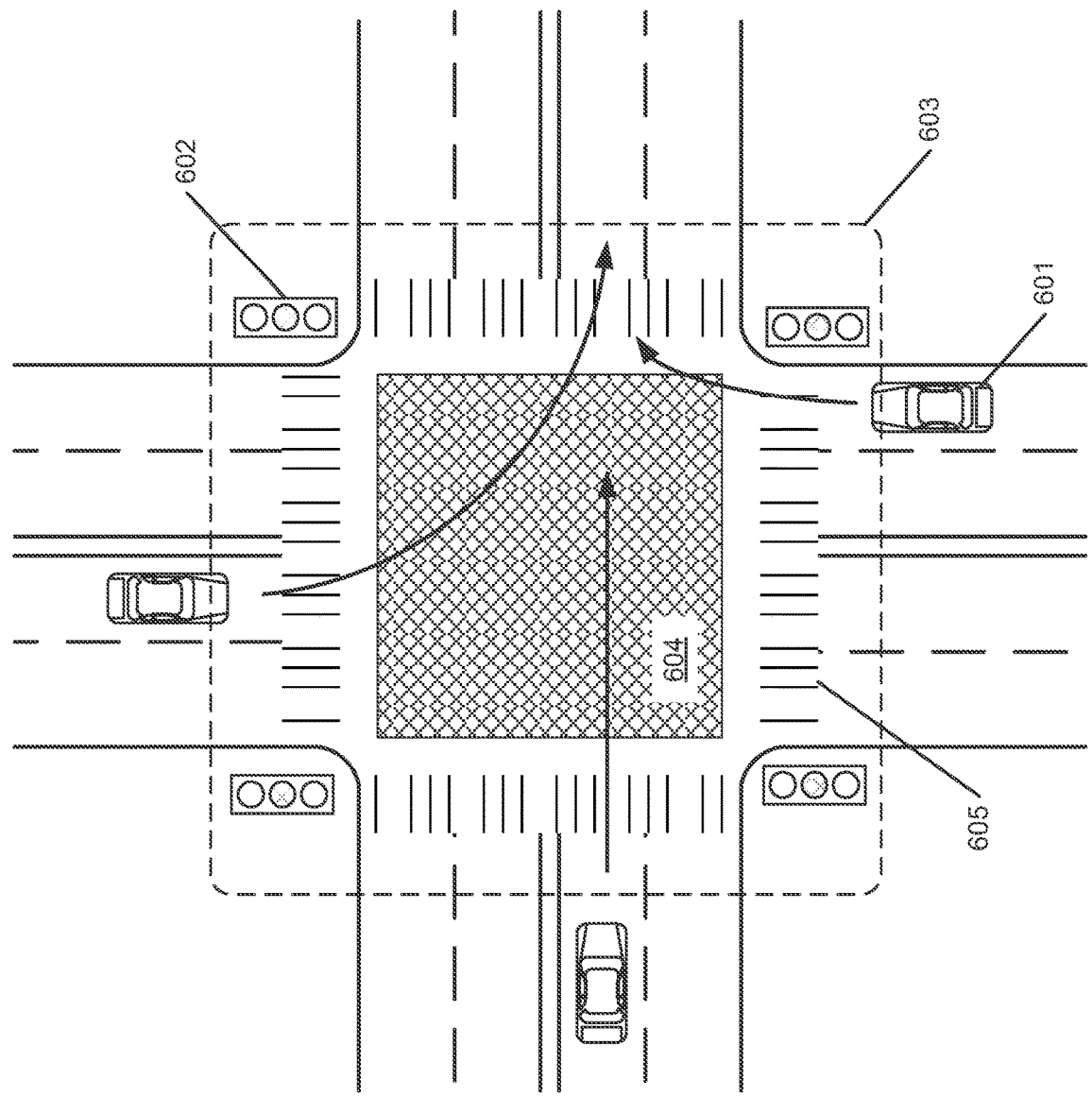
FIG. 6 is a block diagram illustrating an example of driving scenarios according to one embodiment of the invention.

FIG. 6 is a diagram illustrating an example of driving scenarios according to another embodiment of the invention. Referring to FIG. 6, from the point of view of autonomous vehicle represented by master vehicle 501, the perceived environment includes one or more traffic signal sub-environments 602, intersection sub-environment 603, clear zone sub-environment 604, and crosswalk sub-environment 605. As a result, the corresponding handlers to be invoked by planning module 301 include intersection handler 327, crosswalk handle 329, clear zone 330, master vehicle handler 331, and traffic signal handler 332. Based on the information provided by these handlers, planning module 301 can plan accordingly.

Figure 7:
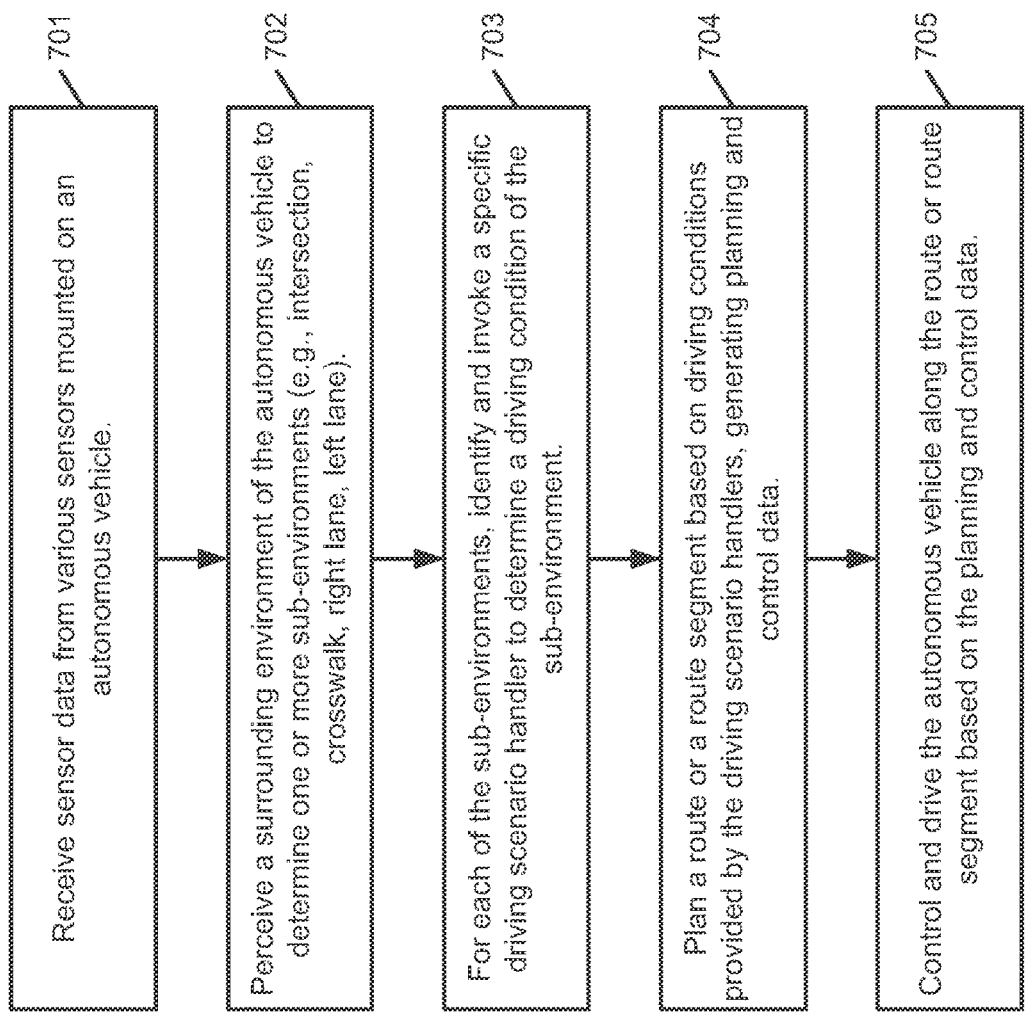
FIG. 7 is a flow diagram illustrating a process of operating an autonomous vehicle according to one embodiment of the invention.

FIG. 7 is a flow diagram illustrating a process of operating an autonomous vehicle according to one embodiment of the invention. Process 700 may be performed by processing logic which may include software, hardware, or a combination thereof. For example, process 700 may be performed by data processing system 110 of FIG. 1. Referring to FIG. 7, at block 701, processing logic receives sensor data from a sensor system having a variety of sensors mounted on an autonomous vehicle. At block 702, processing logic perceives a surrounding environment of the autonomous vehicle based on the sensor data to determine a list of one or more sub-environments. (e.g., intersection, crosswalk, left lane, right lane). For each of the sub-environments, at block 703, processing logic identifies and invokes a specific driving scenario handler corresponding to the sub-environment to determine a driving condition of the sub-environment. At block 704, processing logic plans and generate planning and control data of a route or route segment based on the driving conditions provided by the driving scenario handlers. At block 705, processing logic drives and controls the autonomous vehicle based on the planning and control data.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
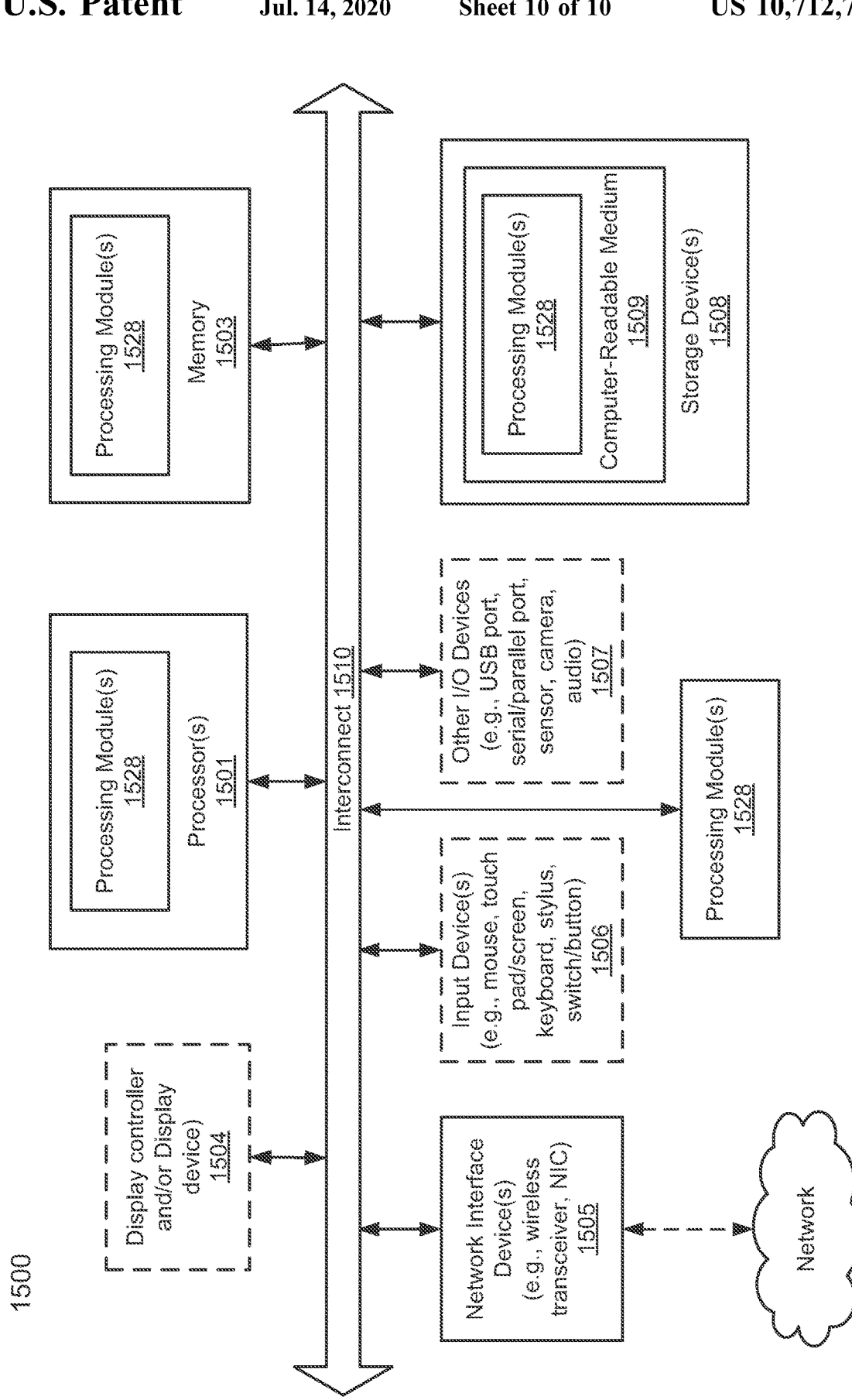
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 301, control module 302, or any of driving scenario handlers 321-334. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
   in response to sensor data received from a plurality of sensors mounted on an autonomous vehicle, perceiving a surrounding environment based on the sensor data, and
      identifying a plurality of sub-environments surrounding the autonomous vehicle in the surrounding environment, comprising dividing the surrounding environment into the plurality of sub-environments based on the sensor data-based perception, wherein each of the plurality of sub-environments is associated with a specific purpose or driving scenario;
   for each of the sub-environments,
      identifying one of a plurality of driving scenario handlers associated with the sub-environment, each driving scenario handler corresponding to one of a plurality of driving scenarios, wherein each of the plurality of driving scenario handlers provides one or more application programming interfaces (APIs) and provides driving parameters indicating how the autonomous vehicle should move within the corresponding sub-environment based on the sensor data, wherein the plurality of driving scenario handlers comprise a first set of driving scenario handlers handling specific driving scenarios and a second set of driving scenario handlers handling common driving scenarios, wherein the second set of driving scenario handlers comprises: a first handler to handle a traffic signal scenario; a second handler to handle a stop sign scenario; and a third handler to handle a yield sign scenario, and wherein each driving scenario handler in the second set is capable of being invoked by any of the driving scenario handlers in the first set, and
      invoking the identified driving scenario handler to determine an individual driving condition within the corresponding sub-environment;
   determining an overall driving condition for the surrounding environment based on the individual driving conditions provided by the identified driving scenario handlers;
   planning a route segment based on the overall driving condition of the surrounding environment, generating planning and control data; and
   controlling the autonomous vehicle based on the planning and control data.

2. The method of claim 1, wherein each of the driving scenario handlers in the first set invokes at least one of the driving scenario handlers in the second set.

3. The method of claim 1, wherein the first set of driving scenario handlers comprises:
   a first handler to handle a right lane scenario;
   a second handler to handle a left lane scenario; and
   a third handler to handle an intersection scenario.

4. The method of claim 3, wherein the first set of driving scenario handlers further comprises:
   a fourth handler to handle a head vehicle scenario;
   a fifth handler to handle a tailgate vehicle scenario; and
   a sixth handler to handle a crosswalk scenario.

5. A non-transitory machine-readable medium having instructions stored therein, which when executed by a processor, cause the processor to perform operations of operating an autonomous vehicle, the operations comprising:
   in response to sensor data received from a plurality of sensors mounted on an autonomous vehicle, perceiving a surrounding environment based on the sensor data, and
      identifying a plurality of sub-environments surrounding the autonomous vehicle in the surrounding environment, comprising dividing the surrounding environment into the plurality of sub-environments based on the sensor data-based perception, wherein each of the plurality of sub-environments is associated with a specific purpose or driving scenario;
   for each of the sub-environments,
      identifying one of a plurality of driving scenario handlers associated with the sub-environment, each driving scenario handler corresponding to one of a plurality of driving scenarios, wherein each of the plurality of driving scenario handlers provides one or more application programming interfaces (APIs) and provides driving parameters indicating how the autonomous vehicle should move within the corresponding sub-environment based on the sensor data, wherein the plurality of driving scenario handlers comprise a first set of driving scenario handlers handling specific driving scenarios and a second set of driving scenario handlers handling common driving scenarios, wherein the second set of driving scenario handlers comprises: a first handler to handle a traffic signal scenario; a second handler to handle a stop sign scenario; and a third handler to handle a yield sign scenario, and wherein each driving scenario handler in the second set is capable of being invoked by any of the driving scenario handlers in the first set, and
      invoking the identified driving scenario handler to determine an individual driving condition within the corresponding sub-environment;
   determining an overall driving condition for the surrounding environment based on the individual driving conditions provided by the identified driving scenario handlers;

planning a route segment based on the overall driving condition of the surrounding environment, generating planning and control data; and controlling the autonomous vehicle based on the planning and control data.

6. The machine-readable medium of claim 5, wherein each of the driving scenario handlers in the first set invokes at least one of the driving scenario handlers in the second set.

7. The machine-readable medium of claim 5, wherein the first set of driving scenario handlers comprises:
a first handler to handle a right lane scenario;
a second handler to handle a left lane scenario; and
a third handler to handle an intersection scenario.

8. The machine-readable medium of claim 7, wherein the first set of driving scenario handlers further comprises:
a fourth handler to handle a head vehicle scenario;
a fifth handler to handle a tailgate vehicle scenario; and
a sixth handler to handle a crosswalk scenario.

9. A data processing system, comprising:
a processor; and
a memory coupled to the processor to store instructions, which when executed by the processor, cause the processor to perform operations of operating an autonomous vehicle, the operations including in response to sensor data received from a plurality of sensors mounted on an autonomous vehicle, perceiving a surrounding environment based on the sensor data, and identifying a plurality of sub-environments surrounding the autonomous vehicle in the surrounding environment, comprising dividing the surrounding environment into the plurality of sub-environments based on the sensor data-based perception, wherein each of the plurality of sub-environments is associated with a specific purpose or driving scenario, for each of the sub-environments, identifying one of a plurality of driving scenario handlers associated with the sub-environment, each driving scenario handler corresponding to one of a plurality of driving scenarios, wherein each of the plurality of driving scenario handlers provides one or more application programming interfaces (APIs) and provides driving parameters indicating how the autonomous vehicle should move within the corresponding sub-environment based on the sensor data, wherein the plurality of driving scenario handlers comprise a first set of driving scenario handlers handling specific driving scenarios and a second set of driving scenario handlers handling common driving scenarios, wherein the second set of driving scenario handlers comprises: a first handler to handle a traffic signal scenario; a second handler to handle a stop sign scenario; and a third handler to handle a yield sign scenario, and wherein each driving scenario handler in the second set is capable of being invoked by any of the driving scenario handlers in the first set, and invoking the identified driving scenario handler to determine an individual driving condition within the corresponding sub-environment, determining an overall driving condition for the surrounding environment based on the individual driving conditions provided by the identified driving scenario handlers, planning a route segment based on the overall driving condition of the surrounding environment, generating planning and control data, and controlling the autonomous vehicle based on the planning and control data.

10. The system of claim 9, wherein each of the driving scenario handlers in the first set invokes at least one of the driving scenario handlers in the second set.

11. The system of claim 9, wherein the first set of driving scenario handlers comprises:
a first handler to handle a right lane scenario;
a second handler to handle a left lane scenario; and
a third handler to handle an intersection scenario.

12. The system of claim 11, wherein the first set of driving scenario handlers further comprises:
a fourth handler to handle a head vehicle scenario;
a fifth handler to handle a tailgate vehicle scenario; and
a sixth handler to handle a crosswalk scenario.

* * * * *